(12) United States Patent
Von Helmolt et al.

(10) Patent No.: US 8,454,730 B2
(45) Date of Patent: Jun. 4, 2013

(54) METHOD OF OPERATING GAS STORAGE AND SUPPLY SYSTEM

(75) Inventors: Rittmar Von Helmolt, Mainz (DE); Ulrich Eberle, Mainz (DE); Dieter Hasenauer, Weinheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 311 days.

(21) Appl. No.: 12/763,415

(22) Filed: Apr. 20, 2010

(65) Prior Publication Data

US 2011/0252962 A1    Oct. 20, 2011

(51) Int. Cl.
*F17C 11/00* (2006.01)

(52) U.S. Cl.
USPC .............. 95/95; 95/106; 206/0.7; 429/515

(58) Field of Classification Search
USPC .......... 95/95, 106, 115, 116; 96/146; 206/0.7; 423/648.1, 658.2; 502/526; 429/515
See application file for complete search history.

(56) References Cited

U.S. PATENT DOCUMENTS

| | | | | |
|---|---|---|---|---|
| 7,323,043 | B2 * | 1/2008 | Finamore | 96/146 |
| 7,611,566 | B2 * | 11/2009 | Arnold et al. | 95/114 |
| 7,674,320 | B2 * | 3/2010 | Vadivelu | 95/115 |
| 8,052,784 | B2 * | 11/2011 | Field | 96/146 |
| 2007/0261552 | A1 * | 11/2007 | Arnold et al. | 95/114 |
| 2010/0257873 | A1 * | 10/2010 | Mueller et al. | 62/46.1 |

FOREIGN PATENT DOCUMENTS

DE    102007058671 A1 *   6/2009
WO    WO 2009/071436 A1 *   6/2009

* cited by examiner

*Primary Examiner* — Frank Lawrence, Jr.
(74) *Attorney, Agent, or Firm* — BrooksGroup

(57) ABSTRACT

Various embodiments of a gas storage and supply system and its operation processes having pre-selected temperature and pressure limits are disclosed. Various temperature and pressure profiles may be used to supply stored gas to a gas consuming device.

29 Claims, 9 Drawing Sheets

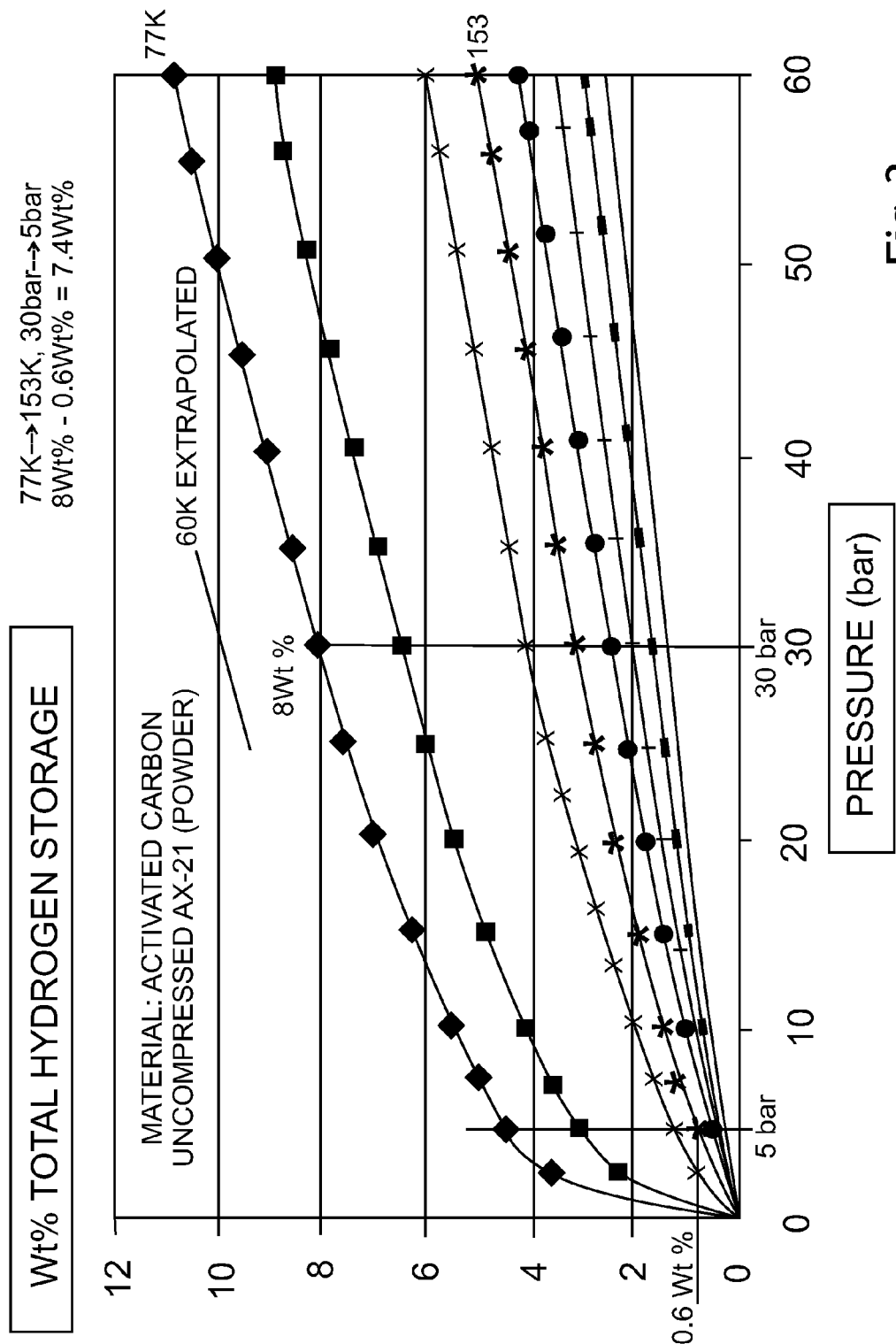

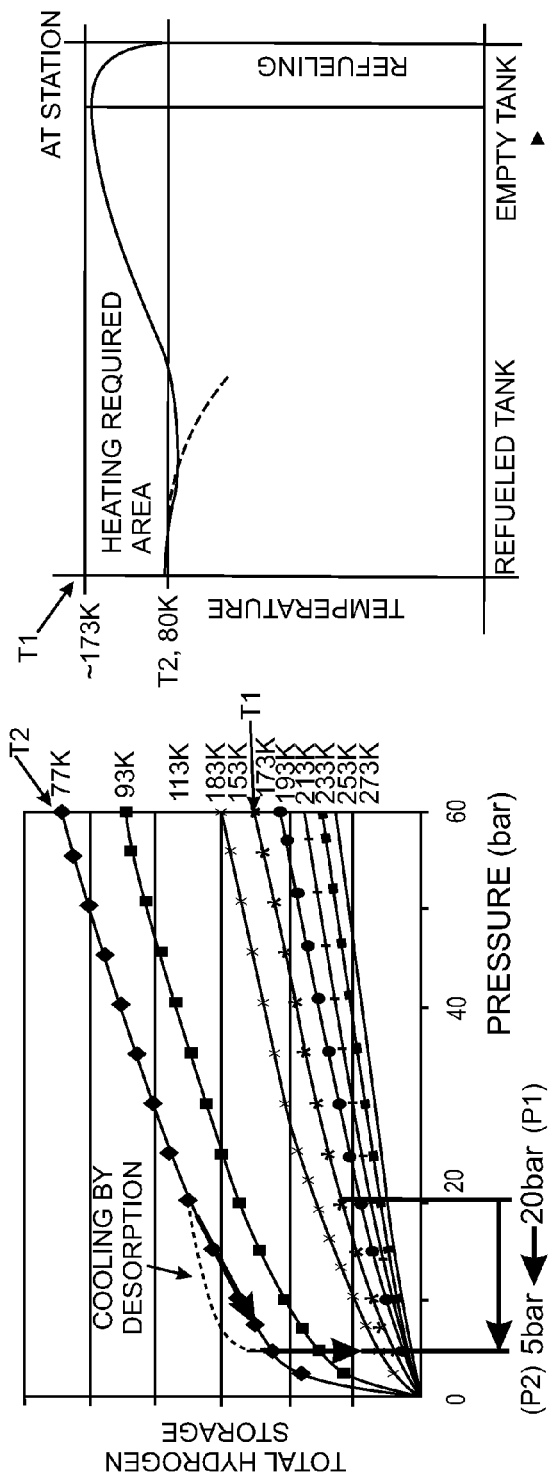
Fig.4a
Fig.4b
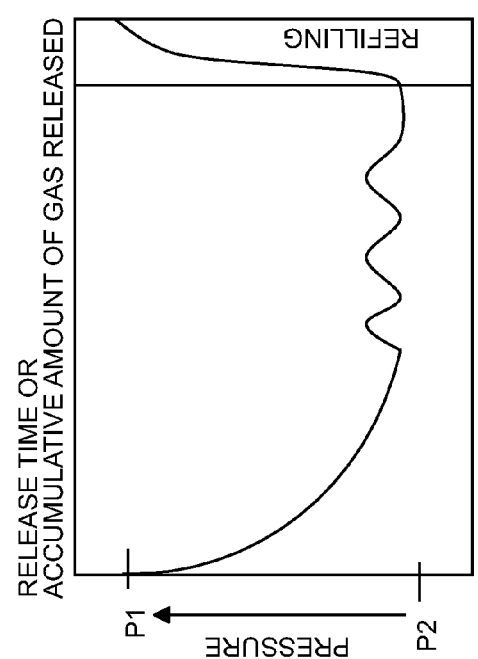
Fig.4c

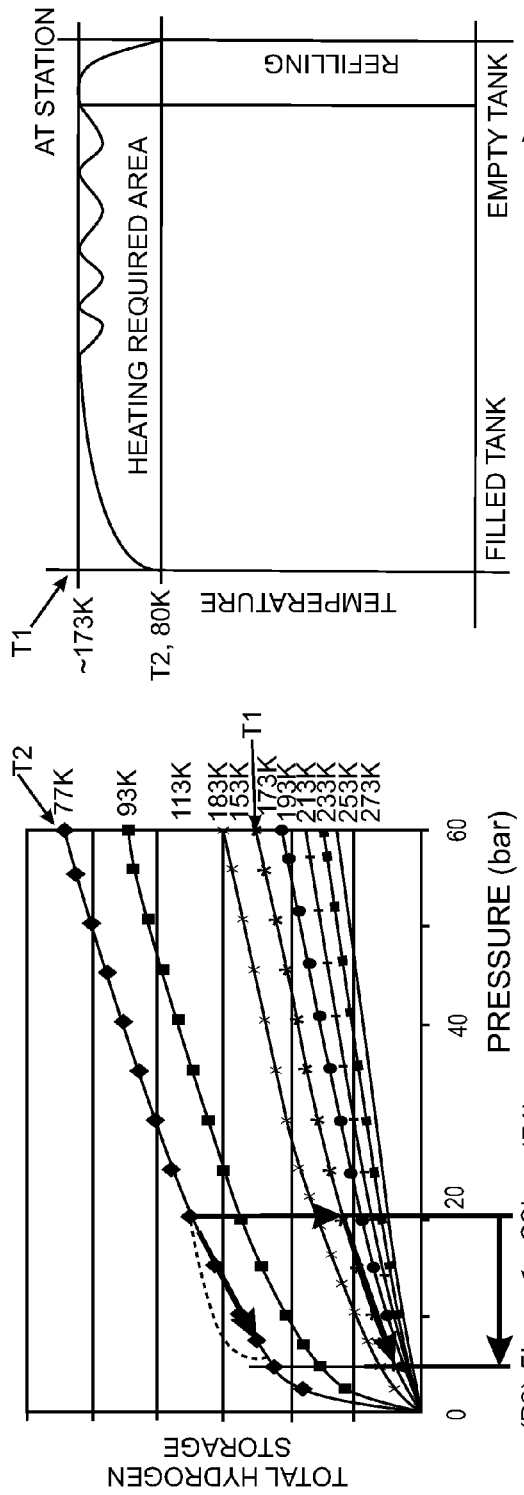
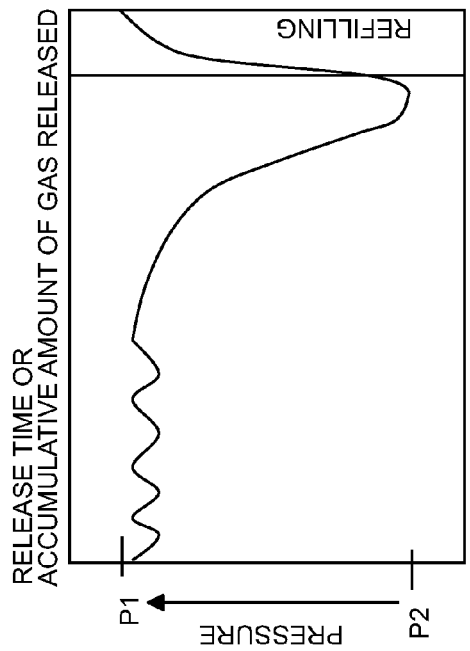
Fig.5a
Fig.5b
Fig.5c

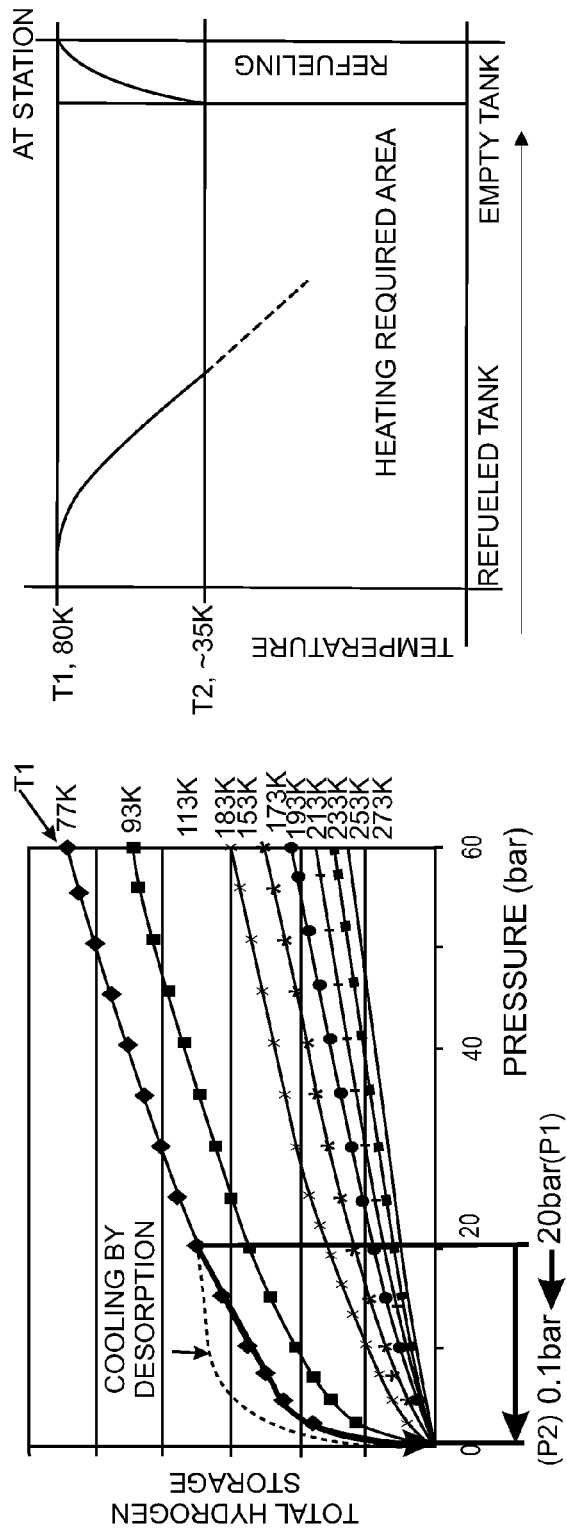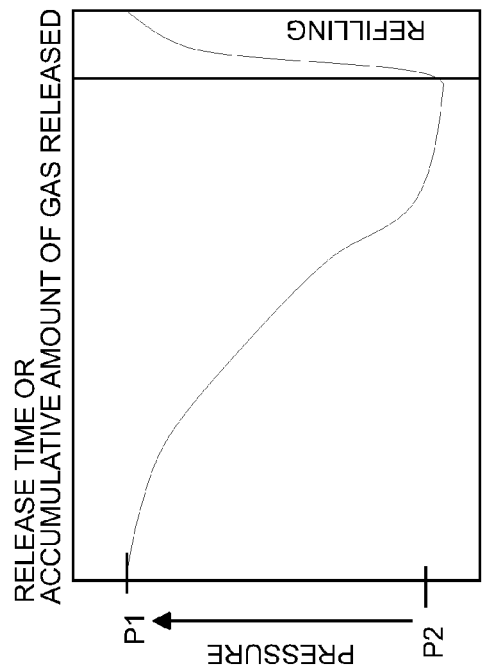

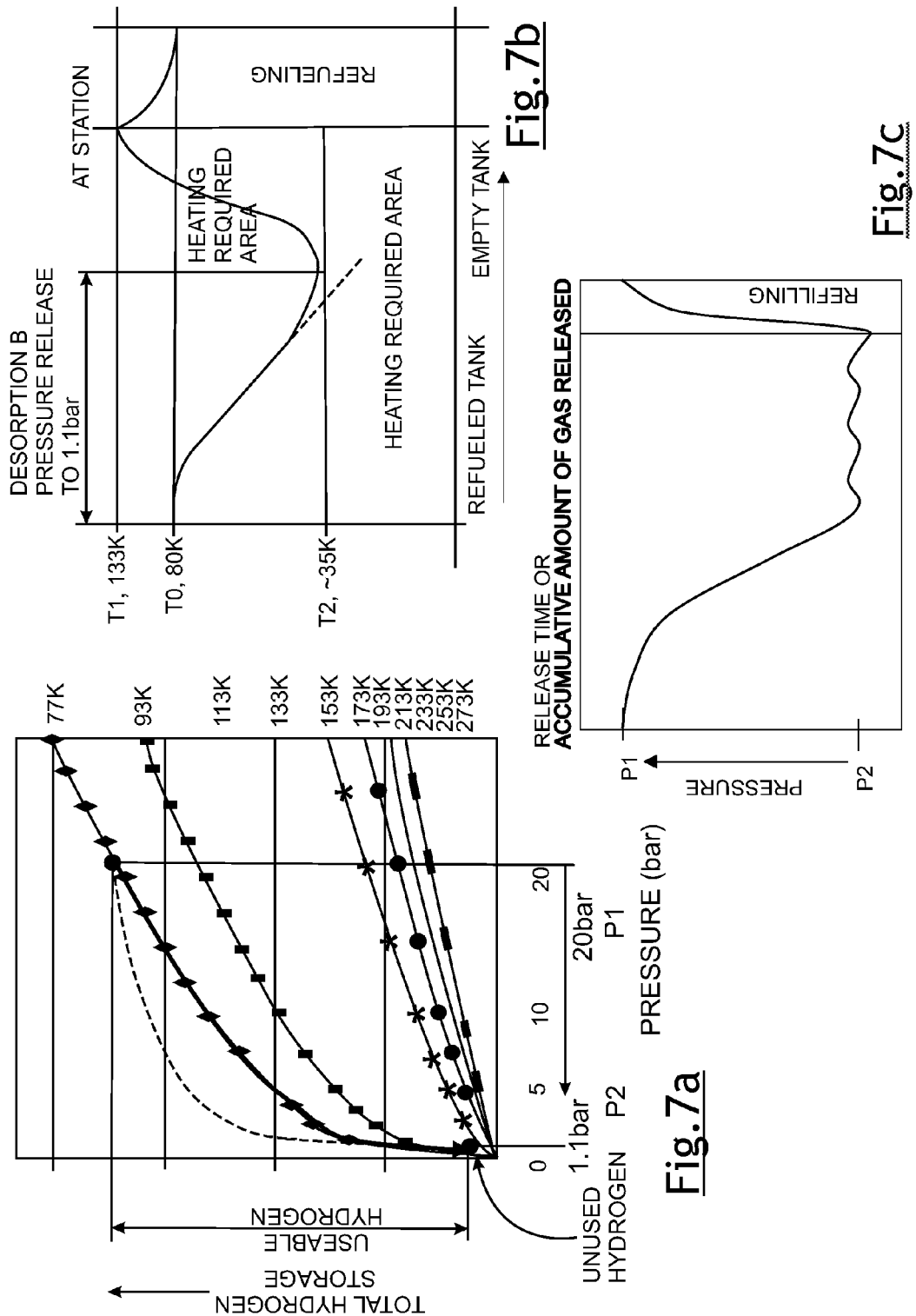

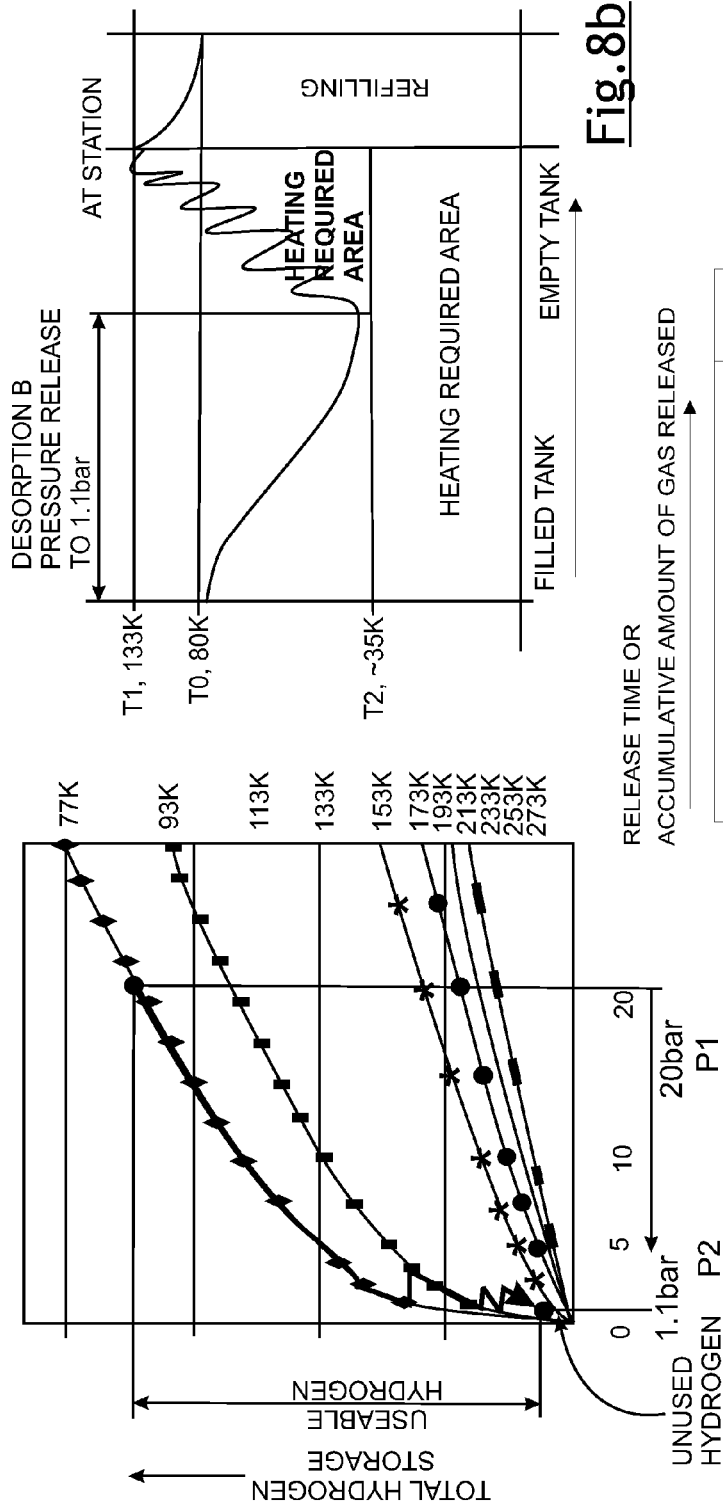
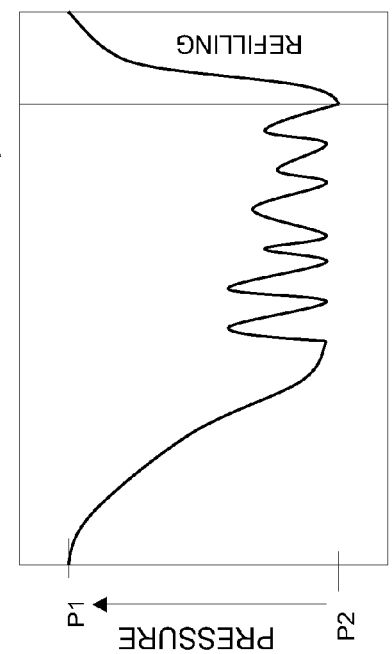
Fig. 8a
Fig. 8b
Fig. 8c

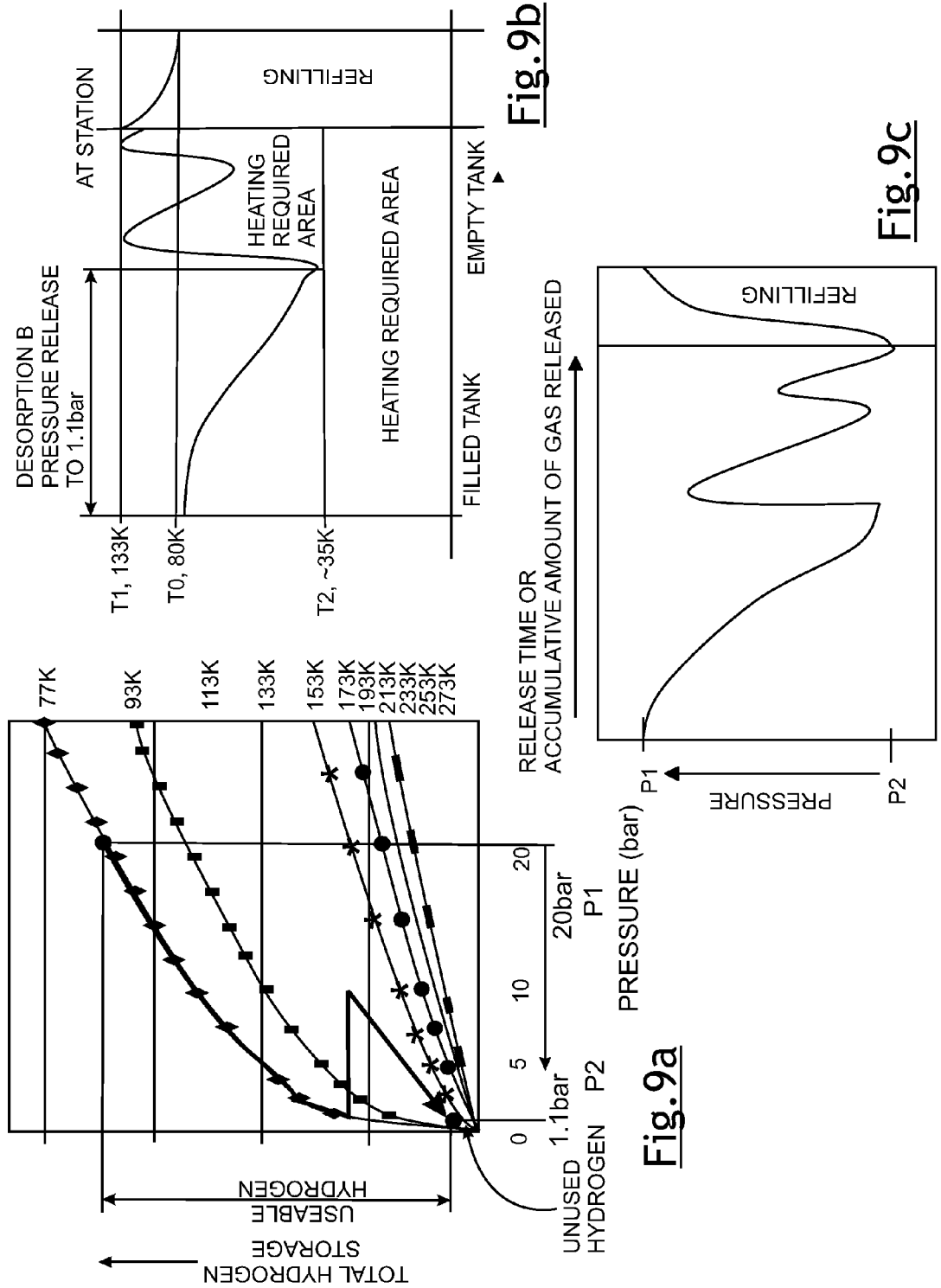

US 8,454,730 B2

METHOD OF OPERATING GAS STORAGE AND SUPPLY SYSTEM

TECHNICAL FIELD

The field to which the disclosure generally relates includes adsorptive storage and supply systems for gases and methods of operation.

BACKGROUND

The storage of hydrogen or other fuel gases is a necessary prerequisite for the commercialization of both stationary and mobile energy efficient and environmentally clean fuel consuming energy systems. Some examples of hydrogen consuming energy systems include hydrogen-propelled vehicles, power plants and electronics. Current storage technologies include compressed gaseous hydrogen, liquid hydrogen, metal hydrides, and adsorptive hydrogen. Key challenges of fuel gas storage and supply systems include high fuel gas storage density, high utilization of storage gas and optimal control of fuel gas release from a storage device to a gas consuming device. Some of the current designs of fuel gas storage and supply systems do not provide a high level of utilization of stored gas. Significantly amount of fuel gas or energy are wasted or underutilized during operation. Other designs lack proper control of fuel gas release to a gas consuming energy device, resulting in undesirable swings of pressure or temperature, waste of stored energy and unreliable supply of fuel gas. Improvements in such systems are thus needed.

SUMMARY OF EXEMPLARY EMBODIMENTS OF THE INVENTION

One embodiment of the invention includes a process comprising: (a) providing a cryo-adsorptive device comprising a container filled with a gas adsorbate having an operation temperature between an upper limit temperature T1 and lower limit temperature T2, and an operation pressure between an upper limit pressure P1 and lower limit pressure P2; (b) releasing the gas from the container while providing heat to the gas adsorbate and maintaining the pressure inside the container between P1 and P2 until the temperature of the gas adsorbate reaches approximately the upper limit temperature T1; and (c) further releasing the gas from the container by reducing the pressure inside the container while maintaining the adsorbate temperature at approximately the upper limit temperature T1 until the pressure inside the container reaches approximately P2.

Another embodiment of the invention include a process comprising: (a) providing an cryo-adsorptive device comprising a container filled with a gas adsorbate with an initial temperature T0 between an upper limit temperature T1 and lower limit temperature T2, and at an initial pressure of P0 between an upper limit pressure P1 and lower limit pressure P2; (b) releasing the stored gas from the container by reducing the pressure inside the container until the pressure inside the container reaches approximately the lower limit pressure P2; and (c) if the temperature of the gas adsorbate is initially at or eventually reaches approximately the lower limit temperature T2, maintaining the gas adsorbate temperature at approximately T2.

In yet another embodiment, a gas storage and supply system comprises: (a) an insulated cryo-adsorptive storage device comprising a gas adsorbent and a fuel gas, and at least one sensor configured to sense temperature and pressure of the adsorbent and fuel gas, (b) a release conduit connected to the storage device having at least one control valve with optional pressure regulator and/or gas compressor, (c) a heating element capable of supplying heat to the adsorbent and fuel gas in the storage device, and (d) a control unit capable of communicating with the sensor and optional external gas demand signals; and switching and/or adjusting the heating element, the control valve; and optionally the pressure regulator and the compressor.

Other exemplary embodiments of the invention will become apparent from the detailed description of exemplary embodiments provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings.

FIG. 3 shows several plots of total amount of stored hydrogen versus pressure at various temperatures.

FIG. 4 shows 3 illustrative plots of hydrogen storage or release amount versus temperature and pressure according to one embodiment.

FIG. 5 shows 3 illustrative plots of hydrogen storage or release amount versus temperature and pressure according to another embodiment.

FIG. 6 shows 3 illustrative plots of hydrogen storage or release amount versus temperature and pressure according to yet another embodiment.

FIG. 7 shows 3 illustrative plots of hydrogen storage or release amount versus temperature and pressure according to one additional embodiment.

FIG. 8 shows 3 illustrative plots of hydrogen storage or release amount versus temperature and pressure according to one other embodiment.

FIG. 9 shows 3 illustrative plots of hydrogen storage or release amount versus temperature and pressure according to a particular embodiment.

DETAILED DESCRIPTION OF EXEMPLARY EMBODIMENTS

The following description of the embodiments is merely exemplary in nature and is in no way intended to limit the invention, its application, or uses.

Figure 1:
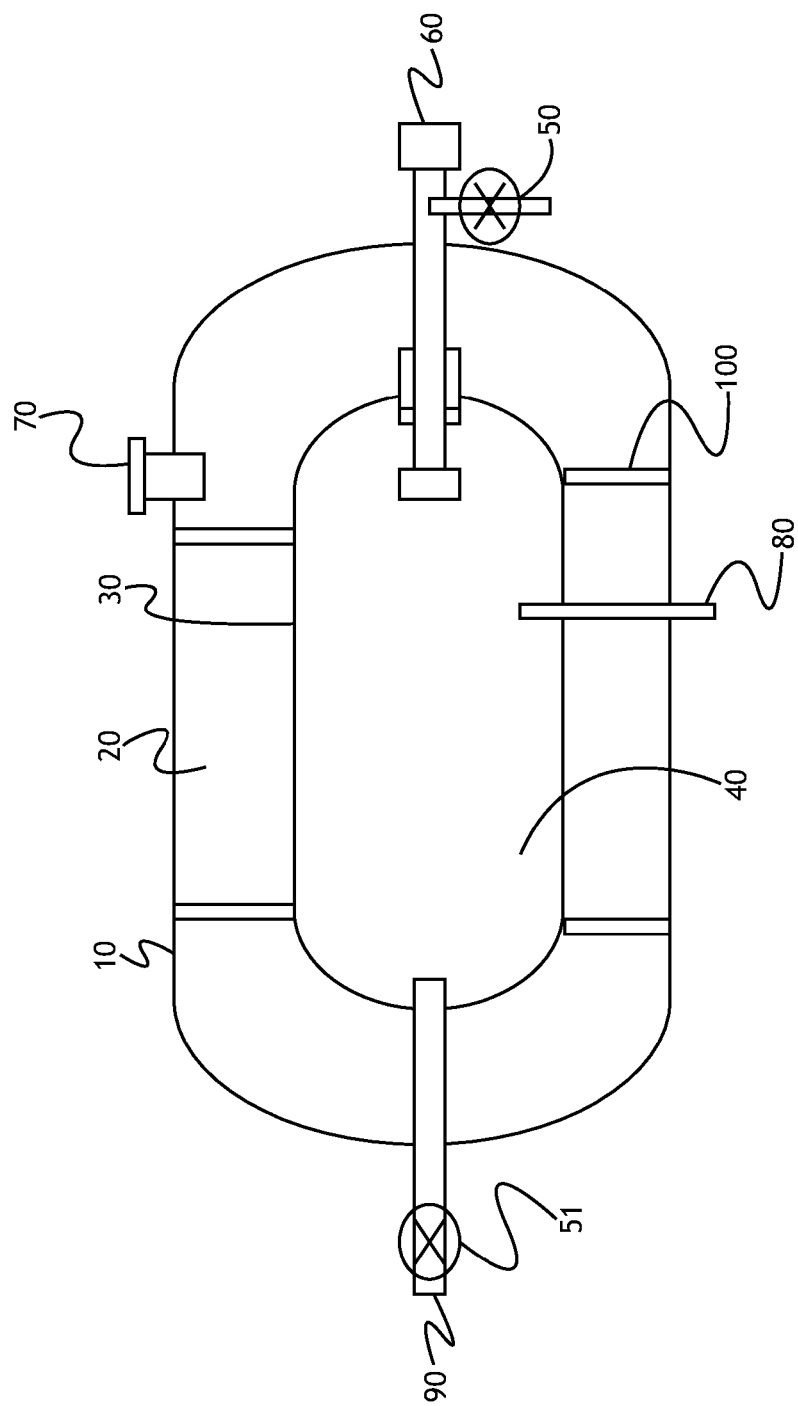
FIG. 1 is a schematic drawing of the cross-section view of a exemplary insulated adsorptive gas storage device.

FIG. 1 shows a schematic drawing of a cryo-adsorptive storage device that may be used to store and to supply a fuel gas to an energy consumption device such as a fuel cell, an internal combustion engine, an electronic device or a hybrid energy device. A fuel gas such as hydrogen, methane, and natural gas may be injected or pumped into the storage device where the fuel gas is adsorbed onto a highly porous material, referred to herein as the gas adsorbent. The adsorbed gas is referred to as gas adsorbate. The gas is typically adsorbed on the adsorbent at low storage temperature and release by heating the adsorbate to a higher temperature or by reducing the storage pressure. The cryo-adsorptive device shown in FIG. 1 comprises a outer shell 10, a vacuum or insulation access port 70, an insulation layer 20 comprising vacuum or other insulation materials, a container 30 filled with a gas adsorbent 40, mechanical support 100 for the container, a filling port 60, a gas release conduit with a control vale 50, and a gas injection conduit 90 with a control valve 51. The cryo-adsorptive storage device may also include a temperature and pressure sensor 80, and other elements such as electric heating coils and heat exchangers which are not shown in FIG. 1. Other designs or construction of cryo-adsorptive devices may also be used.

There are no limitations on the types of gas adsorbents used in the cryo-adsorptive gas storage device. Typical gas adsorbents have high specific surface areas and high porosities. Examples of gas adsorbent may include activated carbons, carbon nanotubes, graphites, zeolites, metal-organic frameworks (MOFs), polymers of intrinsic microporosity (PIMs), nanotubes, and coordination polymers (CPs). Although the Applicant does not wish to be bound by or to a particular theory, the gas is believed to be generally adsorbed on the adsorbent by so-called van-der-Waals molecular interaction forces between the gas molecule and the adsorbent surface. The gas adsorbent may be in the forms of powders, granules, compressed pellets, fibers, spheres, foams and the like. The adsorbent is usually permeable to gas flow and/or gas diffusion. The density of gas adsorbent may range from about 0.1 to about 1 g/cm$^3$, or preferably about 0.3 to about 0.7 g/cm$^3$. The surface area, typically in terms of BET surface area (surface area measured using Stephen Brunauer, Paul Hugh Emmett and Edward Teller theory), may range from about 1000 to about 6000 m$^2$/g, or preferably from about 2000 to 5000 m$^2$/g. Light weight adsorbents are typically used as fuel gas adsorbent for high storage density. Light weight adsorbent materials may include microstructural and nano-structural materials of light elements such as Be, B, C, N, O, F, Mg, P, S, and Cl. Hydrogen, for example, may be stored in carbon nanostructures, such as graphite or carbon nanofibers, described in the published paper of A. Dillon et al, in *Nature*, vol. 386, p. 377 (1997). A so-called supersponge, MOF-177, consisting of octahedral Zn$_4$ carboxylate clusters linked to organic groups, is described in *Nature*, vol. 427, p. 523 (2004). MOF-177 is characterized by high surface area— about 4,500 m$^2$/g and thus suitable as a gas adsorbent. MOF-5, a Zn$_4$O(BDC)$_3$ (BDC=1,4-benzenedicarboylate) having a three dimensional porous structure, is well-suited for hydrogen storage. MOF-5 is described in an article published in Science, vol. 300, p. 1127 (2003). A boron oxide microporous solid adsorbent, for an example, is described in US Patent Application Publication number 20040031387. Another example of a gas adsorbent is AX-21 activated carbon powder. AX-21 activated carbon has a surface area of about 2800 m$^2$/g and a density of about 300 kg/m$^3$. It is believed to be available from Anderson Development Co., located in Adrian, Mich.

FIG. 3 shows a series of plots of total amount of stored hydrogen in weight percentage versus pressure at various temperatures using AX-21 activated carbon as the adsorbent. As shown in FIG. 3, amount of stored hydrogen increases with decreasing temperature and increasing pressure. Low temperature and high pressure therefore would give higher hydrogen storage amount. In reality, however, there are limitation on the lowest temperature and highest pressure possible for economical and technical feasibility considerations. Cryo-adsorptive hydrogen, for example, may be stored at 30K to about 200K with a pressure ranging from 1 bar to about 100 bars, depending on the type of adsorbents used and device design. When AX-21 activated carbon is used as the adsorbent, for example, hydrogen may be feasibly stored at a temperature between 30K to about 200K, more preferably between 35K to about 100K, at a pressure between 1 bar to about 100 bars, preferably from 10 bars to about 50 bars. Stored fuel gases, such as hydrogen, are typically released to supply a gas consuming device by increasing adsorbate temperature and/or decreasing pressure.

Gas adsorption onto an adsorbent is usually an exothermal process, while gas de-sorption from the adsorbent is usually an endothermal process. When a fuel gas is pumped into a cryo-adsorptive gas storage device, fuel gas is adsorbed resulting in generation of heat that warms up the gas and the adsorbent. The heat generated by the adsorption process may be removed by circulating out the warm gas in the storage device, and replacing it with cold gas. When gas is desorbed from the adsorbent, on the other hand, the adsorbent and adsorbate gas usually decrease in temperature as a result of the endothermal process if no heat is provided. To facilitate a complete release of stored gas in a cryo-adsorptive device, heat may be applied to the adsorbate gas in addition to reducing pressure.

Heating and cooling inside the cryo-adsorptive storage device can be accomplished by many different methods. An electric heating coil may be included inside the cryo-adsorptive storage device to provide heat to the adsorbent and adsorbate. A heat exchanger may be included inside the gas storage and supply device to warm up the adsorbate gas inside the storage container or the released gas stream. A heat exchange may be used for both heating and cooling. The waste heat of the gas consuming device, such as the cooling water, exhaust gas, and cooling air streams from a fuel cell or an internal combustion engine, may be used to supply the heat exchanger to warm up the stored gas or released gas stream. A heat pump driven by electricity or a fuel gas, may also be used to provide heat or to remove heat. Ambient air or water may also be used to heat up the cryo-adsorptive device or the gas since the operating temperature of such device and its stored gas are generally below the ambient temperature. Furthermore, cooling may also be provided by simply releasing the stored gas and allowing the pressure inside the container of the cryo-adsorptive device to drop. Other heating and cooling methods known to an ordinary skill in the art may also be used.

Figure 2:
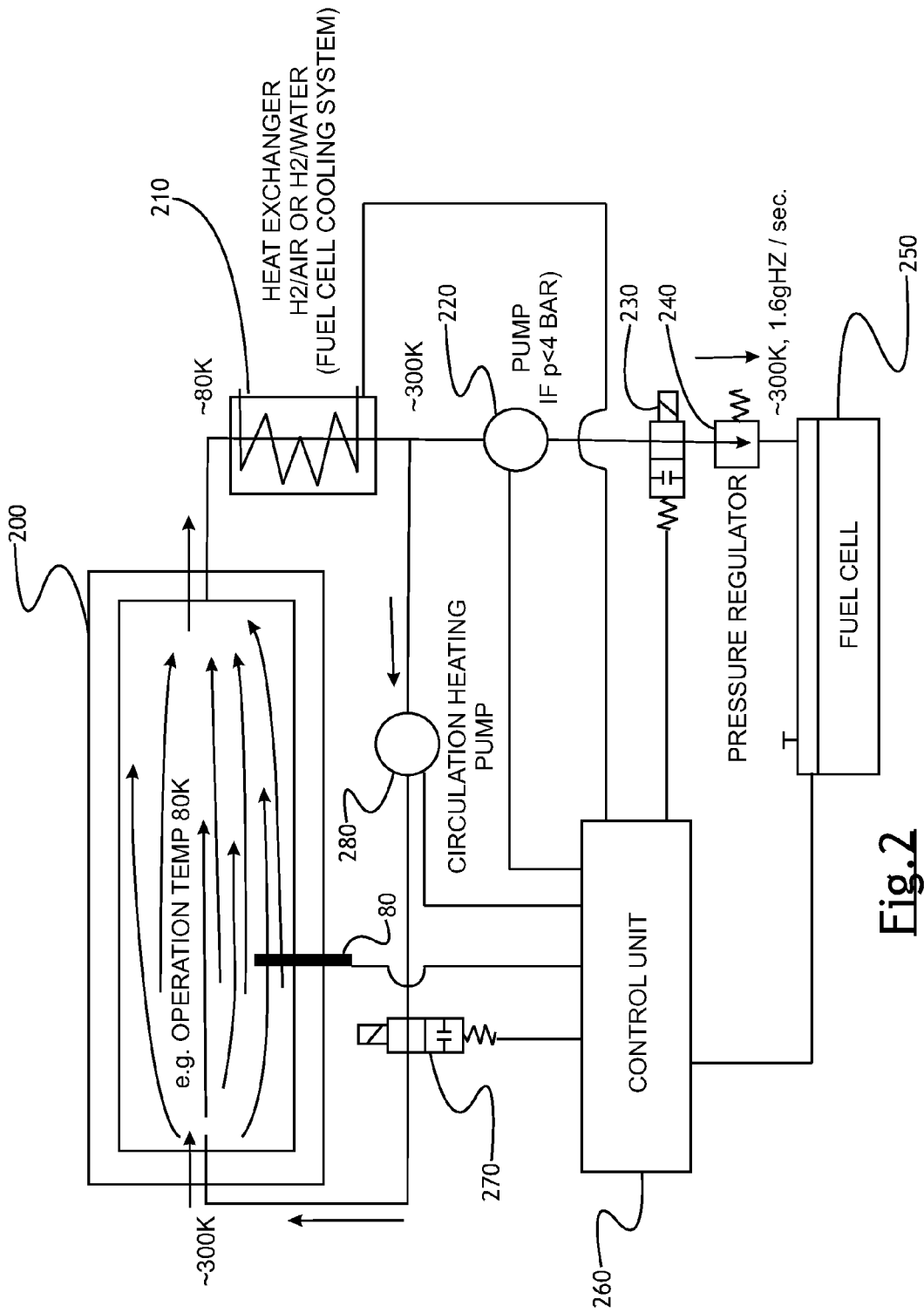
FIG. 2 illustrates a fuel gas storage and supply system according to one embodiment of the invention.

FIG. 2 illustrates a fuel gas storage and supply system according to one embodiment of the invention. The system comprises a cryo-adsorptive storage device 200 having an gas outlet connected in series to a heat exchanger 210, an optional gas pump or compressor 220, a controllable switchable valve 230, a pressure regulator 240, and a fuel cell 250. Pressure regulator 240 provides the necessary gas pressure and flow rate to the gas consuming device 250. Although the regulator 240 is not shown to be connected to the control unit 260, it may be configured to communicate with the control unit depending on the build-in control functions of the regulator and the requirement of the system. Pump 220 is capable of compressing the released gas from the outlet and thus increasing the gas pressure to a necessary level to supply the fuel cell 250. Part of the outlet gas stream may be recycled back into the storage device by passing through a circulation heating pump 280 and a switchable valve 270. The recycled gas stream may be circulated inside the container of the cryo-adsorptive storage device for effective heat exchange with the porous gas adsorbent and adsorbate. The cryo-adsorptive device may also include a temperature and pressure sensor 80 that can communicate the temperature and pressure signals to a control unit 260 that is capable of processing the input signals along with other inputs, and provide proper control command to the switches, heat exchangers, pumps and other actionable components of the system. The control unit 260 may also receive gas demand signals from the gas consuming device, such as the fuel cell 250, and activate the corresponding release switches and pumps accordingly. The control unit 260 is also capable of adjusting the temperature and pressure of the cryo-adsorptive device by controlling the gas release, recycling gas input, heating supply to the device and the like. Any profiles of temperature change or pressure change may be provided by the system. The profile of temperature and pressure may be pre-selected in a particular design, or be chosen based on the gas demand pattern or signals from the gas consuming device. In addition, the system described above is capable of controlling the temperature and pressure within a designed range of operation for reliability and safety.

Different processes may be used to operate the system described above with varying degrees of reliability, efficiency, and cost. The embodiments described below generally provide improvement in usable amount of stored fuel gas, reliability of fuel gas supply to an gas consuming device, and reduced cost and complexity. The following embodiments and examples include their designed upper limit temperature T1, lower limit temperature T2, upper limit pressure P1 and lower limit pressure P2 for the cryo-adsorptive device. In the case for hydrogen storage, the upper temperature limit T1 may be in the range of 80K to about 200K. The lower limit temperature may be in the range of 80K to about 30K. The lower pressure limit may be in the range of 0.1 bar to about 10 bars and the upper pressure limit may be in the range of 10 bars to about 100 bars. The temperature and pressure inside the cryo-adsorptive storage container are controlled between their corresponding lower and upper limit values. The rate of temperature change, pressure change and gas release are generally determined by the gas demand, tank filling level, and mode of operation in each of the embodiments. The gas may be release from the cryo-adsorptive device at a flow rate of about 0.1 to 100 gram per second, or preferably, 0.2 to about 10 gram per second depending on the demand from the gas consuming device. As described in more details below, those design limits specific for each of the systems and processes significantly improves the simplicity and reliability of the operation of the system.

In one embodiment, the stored gas is initially released from the cryo-adsorptive device by allowing the pressure inside the storage container to drop. As the stored gas is desorbed from the adsorbent and released from the storage container, the temperature of the adsorbate/adsorbent tends to fall due to the nature of the endothermal desorption process. Heat may be provided to the adsorbent and adsorbate using one of the heating methods described above to prevent the temperature from falling below the lower limit T2. After certain amount of stored gas is released from the container and the pressure inside the container drops to approximately the lower pressure limit P2, additional heat is then supplied to the adsorbent and adsorbate causing the temperature to rise and more stored gas to desorb from the adsorbent. The pressure inside the container may be maintained at about P2 or be allowed to rise somewhat above P2 depending on the gas demand and rate of temperature rise. Eventually, the temperature is allowed to rise to the upper limit T1 and pressure is allowed to drops to P2. All usable gas within the design limits is released. The container can be subsequently refilled with the gas for the next round of consumption. In one example, FIG. 4 shows 3 illustrative plots of amount of stored and released hydrogen versus temperature and pressure according to the process described above. In this example, hydrogen gas is initially stored at about 77 to 80K at 20 bar pressure in an AX-21 activated carbon based cryo-adsorptive storage device. The upper and lower design temperatures are about 173K and 80K respectively. The upper and lower pressures are about 20 bar and 5 bars respectively. The lower pressure limit is sufficient for directly input to a hydrogen fuel cell without further compression. Graph (a) in FIG. 4 shows a series of plots of the stored usable amount of hydrogen versus pressure at different temperatures. The arrow rested on the 77K curve in Graph (a) illustrates the first phase release of hydrogen from 20 bars to about 1 bar at about 77K. The second arrow pointing vertically from the 5 bar point on the 77K curve to the 173K curve illustrates the amount of hydrogen release during temperature rise from 77K to 173K in the second phase of hydrogen release. Graph (b) and (c) in FIG. 4 illustrate the respective profiles of temperature and pressure versus accumulative hydrogen release amount or release time. In the first phase, the temperature stays almost constant as shown in graph (b) while the pressure gradually drops to about P2 (5 bar) as shown in graph (c). As more hydrogen is released during the second phase, the pressure stayed at about P2 (5 bar) while the temperature gradually rises to T1 (173K). At 173K and 5 bar, all usable hydrogen within the system design limits is reliably released. The cryo-adsorptive device can then be refilled with hydrogen for the next round of hydrogen supply.

In another embodiment, heat is initially applied to the stored gas adsorbent/adsorbate to cause gas desorption and release of the stored gas from the container while the pressure is maintained at a steady level. When the adsorbent/adsorbate temperature rises to about the upper limit temperature T1, the gas is further released from the storage device by reducing the pressure inside the storage container until the pressure drops to about P2. As the stored gas is further released from the storage container by pressure reduction, additional heat may be supplied to the adsorbent/adsorbate to maintain their temperature at about T1. At temperature T1 and pressure P2, all usable gas within the design limit is released. The container can be subsequently refilled with the gas for the next round of consumption. FIG. 5 shows 3 illustrative plots of amount of stored and released hydrogen versus temperature and pressure according to the process described in this paragraph. In this example, hydrogen gas is initially stored at about 77 to 80K at 20 bar pressure in an AX-21 activated carbon based cryo-adsorptive storage device. The upper and lower design temperatures are about 173K and 80K respectively. The upper and lower pressures are about 20 bars and 5 bars respectively. The lower pressure limit is sufficient for directly input to a hydrogen fuel cell without further compression. Graph (a) in FIG. 5 shows a series of plots of the stored usable amount of hydrogen versus pressure at different temperatures. The arrow pointed from the 20 bars point on the 77K curve vertically to the 173K curve in Graph (a) illustrates the first phase release of hydrogen when temperature of the adsorbed hydrogen is raised from about 77K to about 173K. There is little change in pressure in the first phase. The second arrow pointing from the 20 bars point to the 5 bars point along the 173K curve illustrates the amount of hydrogen release during pressure drop in the second phase. Graph (b) and (c) in FIG. 5 illustrate the respective profiles of temperature and pressure versus accumulative hydrogen release amount or release time. In the first phase, the temperature rises gradually to 173K as shown in graph (b) while the pressure stays almost constant as shown in graph (C). As more hydrogen is released during the second phase, the pressure drops gradually to about P2 (5 bar) while the temperature is maintained at T1 (173K). At 173K and 5 bars, all usable hydrogen within the system design limits is reliably released. The cryo-adsorptive device can then be refilled with hydrogen for the next round of hydrogen supply.

In yet another embodiment, the stored gas is released by allowing the pressure inside the storage container to drop correspondingly. As the gas is desorbed and released from the storage container, the temperature of the adsorbent and adsorbate is also allowed to drop as a result of the endothermal process, until the temperature reaches the lower limit T2. Heat may be supplied to the storage container to maintain the temperature at about T2 as more stored gas is released from the container and the pressure is allowed to drop further to lower limit P2. In this embodiment, not all usable stored gas within the design limit is necessarily released. However, the lower pressure limit may be set at a low value (such as 0.1 bar to 1 bar) to allow sufficient amount of stored gas to be released. Furthermore, the temperature of the storage container reaches the lower limit temperature T2 at the end of gas release cycle. The container can be refilled to a higher storage temperature and pressure with less energy and process demand at the filling station. If the lower limit pressure is set at below atmospheric pressure, the gas storage and transportation lines may be tightly sealed to prevent air or other contaminants from leaking into the system. FIG. 6 shows 3 illustrative plots of amount of stored and released hydrogen versus temperature and pressure according to the process described in this paragraph. In this example, hydrogen gas is initially stored at about 77 to 80K at 20 bar pressure in an AX-21 activated carbon based cryo-adsorptive storage device. The upper and lower design temperatures are about 80K and 35K respectively. The upper and lower pressures are about 20 bar and 0.1 bars respectively. Graph (a) in FIG. 6 shows a series of plots of the stored usable amount of hydrogen versus pressure at different temperatures. As the hydrogen gas is released from the storage container while the pressure is allowed to drop to 0.1 bar, the adsorbed gas is cooled to a lower temperature as a result of the endothermal desorption which is indicated by the dotted lines in Graph (a) of FIG. 6. Graph (b) and (c) in FIG. 6 illustrate the respective profiles of temperature and pressure versus accumulative hydrogen release amount or release time. Both the temperature and pressure are allowed to drops initially as stored hydrogen is released from the storage container as shown in Graph (b) and (c). When the temperature reaches the lower limit temperature 35K as shown in graph (b), heat may be supplied to the container to maintain the temperature at about 35K. The pressure is allowed to drop further to 0.1 bar as additional hydrogen is released. The last part of the pressure drop may be assisted by a vacuum pump. Hydrogen at 0.1 bar pressure may be too low for direct input into a fuel cell as fuel gas. The released hydrogen at 0.1 bar may be compressed to about 5 bar through a compression pump, such as pump 200 shown in FIG. 2, before feeding to a fuel cell. Significant amount of stored hydrogen is utilized during the release cycle due to small value of the lower limit pressure. At the end of the release cycle, the cryo-adsorptive device may be refilled from 35K to 80K. Less energy and simpler filling process may be used as there is less demand to cool the hydrogen during the exothermal gas filling process.

In another embodiment, the stored gas (having an initial storage temperature of T0 between T1 and T2 when the storage container is filled) is released initially by allowing the pressure inside the storage container to drop correspondingly. As the gas is desorbed and released from the storage container, the temperature of the adsorbent and adsorbate is also allowed to drop as a result of the endothermal process, until the temperature reaches the lower limit T2. Heat may be supplied to the storage container to maintain the temperature at about T2 as more stored gas is released from the container while the pressure is allowed to drop further to lower limit P2. Stored gas is further released by heating up the adsorbent and adsorbate in the storage container until the temperature eventually reaches T1. As the temperatures rises, the pressure inside the container may be maintained at P2 or allowed to rise above P2 depending on the fuel gas demand from the connected gas consuming device and the rate of temperature rise. At the end of the release cycle, the pressure is eventually allowed to drop to lower limit P2 and all usable hydrogen within the design limits is released. The lower pressure limit may be slight lower than the required input pressure for a gas consuming device. Small amount of compression may be needed when the released gas is at or near the lower pressure limit P2. The compression may be performed by a pump such as pump 200 shown in FIG. 2. FIG. 7 shows 3 illustrative plots of amount of stored and released hydrogen versus temperature and pressure according to the process described in this paragraph. In this example, hydrogen gas is initially stored at about 77 to 80K at 20 bars pressure in an AX-21 activated carbon based cryo-adsorptive storage device. The upper and lower design temperatures are about 133K and 35K respectively. The upper and lower pressures are about 20 bars and 1.1 bars respectively. Graph (a) in FIG. 7 shows a series of plots of the stored usable amount of hydrogen versus pressure for different temperatures. As the hydrogen gas is released from the storage container while the pressure is allowed to drop to 1.1 bars, the adsorbate and adsorbent are cooled to a lower temperature as a result of the endothermal desorption which is indicated by the dotted lines in Graph (a) of FIG. 7. Heat is provided to the storage container if the temperature drops to about 35K while pressure is still is allowed to drop further towards 1.1 bars. Graph (b) and (c) in FIG. 7 illustrate the respective profiles of temperature and pressure versus accumulative hydrogen release amount or release time. Both the temperature and pressure are allowed to drops initially as stored hydrogen is released from the storage container as shown in Graph (b) and (c). After the temperature is at 35K and pressure drops to about 1.1 bars, additional heat is provided to increase the adsorbate/adsorbent temperature gradually to about 133K as shown in Graph (b) of FIG. 7. The pressure inside the storage tank may be maintained at 1.1 bars or allowed to rise about 1.1 bars depending on the demand for hydrogen from the connected fuel cell or the rate of temperature rise. Since lower pressure limit is slightly above the atmospheric pressure, air or other ambient contaminants are less likely to leak into the system. System reliability is thus improved using such operating process. At the end of the release cycle, the cryo-adsorptive device may be refilled with hydrogen from 133K to about 80K.

In one additional embodiment, the stored gas (having a initial storage temperature of T0 between T1 and T2 when the storage container is filled) is released in the first phase by allowing the pressure inside the storage container to drop correspondingly. As the gas is desorbed and released from the storage container, the temperature of the adsorbent and adsorbate is also allowed to drop as a result of the endothermal process, until the temperature reaches the lower limit T2. Heat may be supplied to the storage container to maintain the temperature at about T2 as more stored gas is released from the container while the pressure is allowed to drop further to lower limit P2. In the second phase, a series of heat pulses are applied to the adsorbent/adsorbate in the storage container, creating a series of upward spikes of temperature and pressure. Stored gas is released after each of the heat pulse by allowing the pressure to drop. Each of the heat pulses therefore creates certain amount of releasable gas depending on the magnitude of the temperature and pressure spikes. This operating process may be used when the demand pattern for the stored gas is intermittent or spiky. The pattern of gas supply may be modulated and configured in this manner to match the dynamic gas demand pattern. After certain numbers of such heat pulses, the temperature eventually reaches T1 and the pressure drops to P2. All usable hydrogen within the design limits is thus released. The lower pressure limit may be slight lower than the required input pressure for a fuel consuming device. Small amount of compression may be needed when the released gas is at or near the lower limit pressure. Compression of released gas may be performed by a pump such as pump 200 shown in FIG. 2. FIG. 8 shows 3 illustrative plots of amount of stored and released hydrogen gas versus temperature and pressure according to the process described in this paragraph. In this example, hydrogen gas is initially stored at about 77 to 80K at 20 bars pressure in an AX-21 activated carbon based cryo-adsorptive storage device. The upper and lower design temperature limits are about 133K and 35K respectively. The upper and lower pressure limits are about 20 bars and 1.1 bars respectively. Graph (a) in FIG. 8 shows a series of plots of the stored usable amount of hydrogen versus pressure for different temperatures. As the stored hydrogen gas is released from the storage container while the pressure is allowed to drop to 1.1 bar, the adsorbate and adsorbent are cooled to a lower temperature as a result of the endothermal desorption which is indicated by the dotted lines in Graph (a) of FIG. 8. Heat is provided to the storage container if the temperature drops to about 35K while pressure is allowed to drop further towards 1.1 bars. Graph (b) and (c) in FIG. 8 illustrate the respective profiles of temperature and pressure versus accumulative hydrogen release amount or release time. In the first phase, both the temperature and pressure are allowed to drop initially as stored hydrogen is released from the storage container, until the temperature reaches T2 and pressure drops to P2 as shown in Graph (b) and (c). In the second phase, a series of heat pulses are provided to the adsorbate/adsorbent, creating a series of temperature and pressure upward spikes as shown in Graph (b) of FIG. 8. Each of the temperature and pressure spikes is followed by release of hydrogen by allowing the pressure to drop. The magnitude of each temperature and pressure spike may be configured to match the dynamic demand for hydrogen from a fuel cell connected to the system. After certain number of heat pulses, the temperature eventually reaches 133K and pressure drops to about 1.1 bars. All releasable hydrogen within the design limit is thus released. At the end of the release cycle, the cryo-adsorptive device may be refilled with hydrogen at about 80K.

In one alternative embodiment, a process similar to the process described in the above paragraph is used except that only two large heat pulses are used in the second phase. The magnitudes of the two heat pulses are configured to match the dynamic gas demand and the gas filling level of the storage device at the time. In one example similar to the example described in the above paragraph, 2 large heat pulses are used in the second phase of the hydrogen release to supply a hydrogen fuel cell. The corresponding usable hydrogen amount, temperature, and pressure curves are illustrated in Graphs (a), (b) and (c) of FIG. 9.

Various embodiments of this invention provide simple, reliable, and yet efficient use of the gas storage and supply system. As a result, the system can be designed with higher usable gas amount, high gas storage density/capacity, longer dormancy, less frequent refilling, higher reliability, better matching capability to gas consumption demand, and lower cost. The gas storage and supply systems and operating processes are particularly useful for fuel cells, gas propelled energy devices used in automotives industry and power stations.

Embodiment 1 of the invention may include a process comprising: (a) providing a cryo-adsorptive device comprising a container filled with a gas adsorbate having an operation temperature between an upper limit temperature T1 and lower limit temperature T2, and an operation pressure between an upper limit pressure P1 and lower limit pressure P2; (b) releasing said gas from said container while providing heat to said gas adsorbate and maintaining the pressure inside said container between P1 and P2 until the temperature of said gas adsorbate reaches approximately the upper limit temperature T1; and (c) further releasing said gas from said container by reducing the pressure inside said container while maintaining said temperature at approximately said upper limit temperature T1 until the pressure inside said container reaches approximately P2.

Embodiment 2 may include a process as set forth in embodiment one further comprising connecting said gas released from said container through a conduit to a gas consuming device, wherein said P2 is greater than 1 bar.

Embodiment 3 of the invention may include a process as set forth in one or more of embodiments 1-2 wherein said heat is supplied by an electric heater, heat exchanger, or part of said released gas that has been heated to a temperature greater than T1 and fed back into said container.

Embodiment 4 of the invention may include a process as set forth in one or more of embodiments 1-3 wherein said pressure inside said container in (b) is approximately P1.

Embodiment 5 of the invention may include a process as set forth in one or more of embodiments 1-4 further comprising refilling said container with said gas and cooling said gas adsorbate to about T2.

Embodiment 6 of the invention may include a process as set forth in one or more of embodiments 1-5 wherein said gas is at least one of hydrogen, methane, or natural gas.

Embodiment 7 of the invention may include a process as set forth in one or more of embodiments 1-6, wherein said T1 is between about 80 to 200 Kelvin, T2 is about 20 to about 80 Kelvin, P1 is about 10 to about 100 bars, and P2 is about 1 to about 10 bars.

Embodiment 8 of the invention may include a process comprising: (a) providing a cryo-adsorptive device comprising a container filled with a gas adsorbate with an initial temperature T0 between an upper limit temperature T1 and lower limit temperature T2, and an initial pressure P0 between an upper limit pressure P1 and lower limit pressure P2; (b) releasing said gas from said container by reducing the pressure inside said container until the pressure inside said container reaches approximately the lower limit pressure P2; and (c) if the temperature of said gas adsorbate is initially at or eventually reaches approximately said lower limit temperature T2, maintaining the gas adsorbate temperature at approximately T2.

Embodiment 9 of the invention may include a process as set forth in embodiment 8 further comprising heating up said gas adsorbate and releasing said gas from said container until the temperature of said gas adsorbate reaches approximately T1 and the pressure inside said container is at approximately P2.

Embodiment 10 of the invention may include a process as set forth in one or more of embodiments 8-9 wherein said T0 is equal to approximately T1.

Embodiment 11 of the invention may include a process as set forth in one or more of embodiments 8-10 wherein said T0 is less than T1 and greater than T2.

Embodiment 12 of the invention may include a process as set forth in one or more of embodiments 8-11 further comprising connecting said gas released from said container through a conduit fitted with at least one pressure regulating valve to a gas consuming device.

Embodiment 13 of the invention may include a process as set forth in one or more of embodiments 8-12 wherein said heat is supplied by an electric heater, a heat exchanger, or part of said released gas that has been heated to a temperature greater than T1 and fed back into said container Embodiment 14 of the invention may include a process as set forth in one or more of embodiments 8-13 wherein said gas is released at a flow rate of about 0.2 to about 10 gram per second through a gas release conduit to a gas consuming device.

Embodiment 15 of the invention may include a process as set forth in one or more of embodiments 8-14 wherein said gas is a fuel gas comprising hydrogen, methane, or natural gas, and said gas consuming device is a fuel cell or an internal combustion engine.

Embodiment 16 of the invention may include a process as set forth in one or more of embodiments 8-15 further comprising compressing the gas released from said container to a pressure P3 greater than said P2.

Embodiment 17 of the invention may include a process as set forth in one or more of embodiments 8-16 wherein said P2 is about 1 bar or less, and said P3 is about 3 to 10 bars.

Embodiment 18 of the invention may include a process as set forth in one or more of embodiments 8-16 wherein said P2 is about 1 to 3 bars, and said P3 is about 3 to about 10 bars.

Embodiment 19 of the invention may include a process as set forth in one or more of embodiments 8-18 further comprising refilling said container with said gas such that the gas adsorbate temperature rises to about T1 or a temperature between T1 and T2.

Embodiment 20 of the invention may include a process as set forth in one or more of embodiments 8-19 further comprising (d) heating up said gas adsorbate to an intermediate temperature between T1 and T2, allowing the pressure inside said container to rise above P2 and subsequently releasing said gas by allowing the pressure inside said container to drop; and (e) optionally repeating (d) at least one time until the temperature of said adsorbate reaches approximately T1 and pressure inside said container reaches approximately P2.

Embodiment 21 of the invention may include a process as set forth in one or more of embodiments 8-20 wherein said heating in (d) is applied in the form of at least one heating pulse.

Embodiment 22 of the invention may include a process as set forth in one or more of embodiments 8-21 further comprising heating up said gas adsorbate to said upper limit temperature T1, allowing the pressure inside said container to rise above said P2; and subsequently releasing said gas until the pressure inside said container drops to approximately P2.

Embodiment 23 of the invention may include a process as set forth in one or more of embodiments 8-22, wherein said gas is at least one of hydrogen, methane, or nature gas Embodiment 24 of the invention may include a process as set forth in one or more of embodiments 8-22, wherein said T1 and T2 are between 20 Kelvin and 200 Kelvin and P1 and P2 are between about 0.1 and 100 bars.

Embodiment 25 of the invention may include a product comprising a gas storage and supply system comprising: an insulated cryo-adsorptive storage device comprising a gas adsorbent and a fuel gas, and at least one sensor configured to sense temperature and pressure of said adsorbent and fuel gas, a release conduit connected to said storage device having at least one control valve with optional pressure regulator and/or gas compressor, a heating element capable of supplying heat to said adsorbent and fuel gas in said storage device, and a control unit capable of communicating with said sensor and optional external gas demand signals; and switching and/or adjusting said heating element, said control valve; and optionally said pressure regulator and said compressor.

Embodiment 26 of the invention may include a product as set forth in embodiment 25, wherein said heating element comprising electric heater, heat exchanger, or recycled said fuel gas that have been warmed to a higher temperature and fed back into said storage device.

Embodiment 27 of the invention may include a process as set forth in one or more of embodiments 25-26, wherein said storage device is configured to have pre-selected upper and lower limits for the temperature and pressure inside said storage device; and said control unit is capable of adjusting the temperature and pressure inside said storage device within their corresponding upper and lower limits.

The above description of embodiments of the invention is merely exemplary in nature and, thus, variations thereof are not to be regarded as a departure from the spirit and scope of the invention.

What is claimed is:

1. A process comprising:
   (a) providing a cryo-adsorptive device comprising a container filled with a gas adsorbate having an operation temperature between an upper limit temperature T1 and lower limit temperature T2, and an operation pressure between an upper limit pressure P1 and lower limit pressure P2;
   (b) releasing said gas from said container while providing heat to said gas adsorbate and maintaining the pressure inside said container between P1 and P2 until the temperature of said gas adsorbate reaches approximately the upper limit temperature T1; and
   (c) further releasing said gas from said container by reducing the pressure inside said container while maintaining said temperature at approximately said upper limit temperature Ti until the pressure inside said container reaches approximately P2.

2. A process as set forth in claim 1 further comprising connecting said gas released from said container through a conduit to a gas consuming device, wherein said P2 is greater than 1 bar.

3. A process as set forth in claim 2, wherein said heat is supplied by an electric heater, heat exchanger, or part of said released gas that has been heated to a temperature greater than T1 and fed back into said container.

4. A process as set forth in claim 1, wherein said pressure inside said container in (b) is approximately P1.

5. A process as set forth in claim 1 further comprising refilling said container with said gas and cooling said gas adsorbate to about T2.

6. A process as set forth in claim 1, wherein said gas is at least one of hydrogen, methane, or natural gas.

7. A process as set forth in claim 1, wherein said T1 is between about 80 to 200 Kelvin, T2 is about 20 to about 80 Kelvin, P1 is about 10 to about 100 bars, and P2 is about 1 to about 10 bars.

8. A process comprising:
   (a) providing a cryo-adsorptive device comprising a container filled with a gas adsorbate with an initial temperature T0 between an upper limit temperature T1 and lower limit temperature T2, and an initial pressure P0 between an upper limit pressure P1 and lower limit pressure P2;
   (b) releasing said gas from said container by reducing the pressure inside said container until the pressure inside said container reaches approximately the lower limit pressure P2; and (c) if the temperature of said gas adsorbate is initially at or eventually reaches approximately said lower limit temperature T2, maintaining the gas adsorbate temperature at approximately T2.

9. A process as set forth in claim 8 further comprising after step (c) heating up said gas adsorbate and releasing said gas from said container until the temperature of said gas adsorbate reaches approximately T1 and the pressure inside said container is at approximately P2.

10. A process as set forth in claim 8, wherein said T0 is equal to approximately T1.

11. A process as set forth in claim 8, wherein said T0 is less than T1 and greater than T2.

12. A process as set forth in claim 8 further comprising connecting said gas released from said container through a conduit fitted with at least one pressure regulating valve to a gas consuming device.

13. A process as set forth in claim 8, wherein said heat is supplied by an electric heater, a heat exchanger, or part of said released gas that has been heated to a temperature greater than T1 and fed back into said container.

14. A process as set forth in claim 8, wherein said gas is released at a flow rate of about 0.2 to about 10 gram per second through a gas release conduit to a gas consuming device.

15. A process as set forth in claim 12, where in said gas is a fuel gas comprising hydrogen, methane, or natural gas, and said gas consuming device is a fuel cell or an internal combustion engine.

16. A process as set forth in claim 8 further comprising compressing the gas released from said container to a pressure P3 greater than said P2.

17. A process as set forth in claim 16, wherein said P2 is about 1 bar or less, and said P3 is about 3 to 10 bars.

18. A process as set forth in claim 16, wherein said P2 is about 1 to 3 bars, and said P3 is about 3 to about 10 bars.

19. A process as set forth in claim 16 further comprising refilling said container with said gas such that the gas adsorbate temperature rises to about T1 or a temperature between T1 and T2.

20. A process as set forth in claim 8 further comprising
   (d) heating up said gas adsorbate to an intermediate temperature between T1 and T2, allowing the pressure inside said container to rise above P2 and subsequently releasing said gas by allowing the pressure inside said container to drop.

21. A process as set forth in claim 20, wherein said heating in (d) is applied in the form of at least one heating pulse.

22. A process as set forth in claim 8 further comprising heating up said gas adsorbate to said upper limit temperature T1, allowing the pressure inside said container to rise above said P2; and subsequently releasing said gas until the pressure inside said container drops to approximately P2.

23. A process as set forth in claim 8, wherein said gas is at least one of hydrogen, methane, or nature gas.

24. A process as set forth in claim 8, wherein said T1 and T2 are between 20 Kelvin and 200 Kelvin and P1 and P2 are between about 0.1 and 100 bars.

25. A process comprising:
(a) providing a cryo-adsorptive device comprising a container filled with a gas adsorbate having an operation temperature between an upper limit temperature T1 and lower limit temperature T2, and an operation pressure between an upper limit pressure P1 and lower limit pressure P2;
(b) releasing said gas from said container while providing heat to said gas adsorbate and allowing the pressure to drop to about P2 while maintaining the temperature at a steady level; and
(c) further releasing said gas from said container by increasing the temperature to T1 while maintaining the pressure at P2.

26. A process comprising:
(a) providing a cryo-adsorptive device comprising a container filled with a gas adsorbate having an operation temperature between an upper limit temperature T1 and lower limit temperature T2, and an operation pressure between an upper limit pressure P1 and lower limit pressure P2;
(b) heating the gas adsorbate to Ti while maintaining the pressure at a steady level, and thereafter releasing said gas from said container while providing heat to said gas adsorbate and allowing the pressure to drop to about P2 while maintaining the temperature at T1.

27. A process comprising:
(a) providing a cryo-adsorptive device comprising a container filled with a gas adsorbate having an operation temperature between an upper limit temperature T1 and lower limit temperature T2, and an operation pressure between an upper limit pressure P1 and lower limit pressure P2;
(b) releasing said gas from said container and allowing the pressure to drop to about P2 and heating the adsorbate to maintain the temperature at T2 until no more gas is released from the container.

28. A process comprising:
(a) providing a cryo-adsorptive device comprising a container filled with a gas adsorbate having an operation temperature between an upper limit temperature T1 and lower limit temperature T2, and an operation pressure between an upper limit pressure P1 and lower limit pressure P2;
(b) releasing said gas from the container comprising heating the gas adsorbate by applying a series of at least three heat pulses so that upon each heat pulse the temperature is increased to T1; and thereafter allowing the pressure to drop to a pressure about P2.

29. A process comprising:
(a) providing a cryo-adsorptive device comprising a container filled with a gas adsorbate having an operation temperature between an upper limit temperature T1 and lower limit temperature T2, and an operation pressure between an upper limit pressure P1 and lower limit pressure P2;
(b) releasing gas from the container comprising allowing the pressure to drop to P2 and thereafter spiking the temperature to T1 and thereafter allowing the pressure to drop and the temperature to drop to a temperature above T2, and thereafter spiking the temperature to T1 and there after allowing the pressure to drop.

* * * * *